United States Patent
Ladirat et al.

(10) Patent No.: US 6,928,869 B2
(45) Date of Patent: Aug. 16, 2005

(54) STICK FOR MEASURING THE LEVEL OF A MOLTEN METAL BATH

(75) Inventors: Christian Ladirat, Saint Laurent des Arbes (FR); Jean-Louis Maurin, Bagnols-sur-Ceze (FR); Pascal Bouland, Motigny le Bretonneux (FR); Guillaume Mehlman, Paris (FR)

(73) Assignees: Compagnie Generale des Matieres Nucleaires, Velizy-Villacoublay (FR); Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/415,347

(22) PCT Filed: Nov. 12, 2001

(86) PCT No.: PCT/FR01/03520

§ 371 (c)(1),
(2), (4) Date: May 1, 2003

(87) PCT Pub. No.: WO02/39070

PCT Pub. Date: May 16, 2002

(65) Prior Publication Data

US 2004/0025587 A1 Feb. 12, 2004

(30) Foreign Application Priority Data

Nov. 13, 2000 (FR) .............................................. 00 14541

(51) Int. Cl.⁷ .............................................. G01F 23/00
(52) U.S. Cl. ........................................ 73/300; 73/290 R
(58) Field of Search ............................... 73/290 R, 298, 73/300

(56) References Cited

U.S. PATENT DOCUMENTS

| | | | | | |
|---|---|---|---|---|---|
| 3,525,508 A | * | 8/1970 | Herff et al. | ............... | 239/132.3 |
| 3,843,105 A | * | 10/1974 | Chang | ........................ | 266/226 |
| 5,298,887 A | * | 3/1994 | Pepping | ..................... | 340/618 |
| 5,567,286 A | * | 10/1996 | Pal et al. | ..................... | 204/246 |
| 5,593,634 A | * | 1/1997 | Waite et al. | ................. | 266/217 |
| 5,660,614 A | * | 8/1997 | Waite et al. | .................. | 75/680 |
| 5,669,956 A | | 9/1997 | Behring et al. | ............... | 73/386 |
| 6,056,803 A | * | 5/2000 | Waite | ......................... | 75/678 |
| 6,212,218 B1 | * | 4/2001 | Shver | .......................... | 373/72 |

FOREIGN PATENT DOCUMENTS

EP      0 580 004      1/1994

\* cited by examiner

*Primary Examiner*—Hezron Williams
*Assistant Examiner*—Rodney Frank
(74) *Attorney, Agent, or Firm*—Oblon, Spivak, McClelland, Maier & Neustadt, P.C.

(57) ABSTRACT

A measurement rod for measuring the level of a liquid bath is cooled but is provided with a solid end piece so that the bath cannot solidify in front of the orifice of the measurement gas injected in the bath, for which the pressure is being measured.

6 Claims, 1 Drawing Sheet

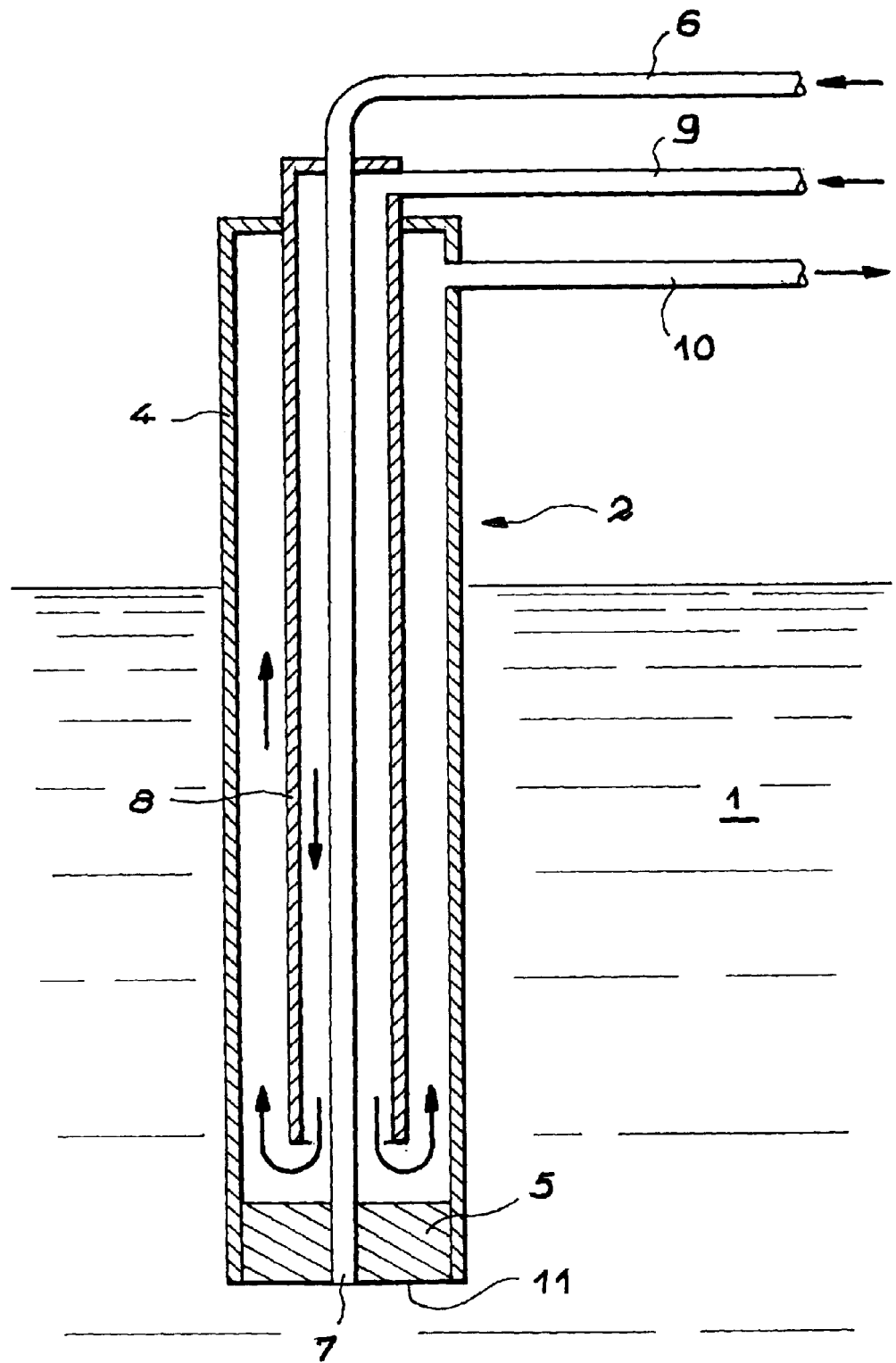

STICK FOR MEASURING THE LEVEL OF A MOLTEN METAL BATH

The invention relates to a rod for measuring the level of a molten liquid bath.

This type of rod is used to determine the depth of very hot material baths that are difficult to access for observation, located in crucibles. The measurement is made by injecting a constant flow gas into the liquid bath, getting it to pass through a duct inside the rod that opens up at a lower free end in the liquid bath, and measuring the pressure to be applied to the gas to impose injection at the required flow.

A limitation to these measurement rods occurs if the bath temperature is high, which is the case in some vitrification applications, since the usual metallic materials used to make the rod lose their strength at these temperatures. Furthermore, some liquid baths such as baths that contain elements such as sulphates, chlorides or molybdenum become very corrosive. The rods then have to be replaced frequently.

The purpose of this invention is to improve the structure of these level measurement rods to make them capable of resisting liquid baths in which conditions are too severe for normal measurement rods.

The selected solution consists of cooling the rod by an internal circuit through which cold liquid flows. This process is effective in preventing corrosion and loss of strength, but it is essential to avoid causing solidification of the bath at the outlet from the gas duct since it will then be impossible to inject gas from the rod. Heat exchange between the molten bath and a much colder coolant creates intense cooling of the molten bath close to the rod.

The improved structure of the level measurement rod proposed in this presentation to satisfy these requirements comprises a gas injection duct into the liquid bath at one free end of the rod, and innovatively, a side casing surrounding a cooling liquid channel, and an end piece at the free end thicker than the side casing, and solid. The thick and solid end piece locally reduces heat transfer and helps to keep the bath at a higher temperature in front of it than around the side casing. This arrangement keeps the bath in a liquid state, without being too viscous, around the free end of the end piece and therefore maintains gas injection for the level measurement to be made at the required flow.

Advantageously, the casing is made of metal, contains a sleeve concentric with it separating a cooling liquid supply channel from a cooling liquid evacuation channel, the end piece has an appropriate thickness equal to 35 mm in one particular example, and more generally a few centimetres, and the flow of the cooling liquid is adjusted to cool the liquid bath to a temperature slightly greater than the solidification temperature (for example 1000° C.) in front of the end piece.

We will now describe the invention in more detail with reference to the single FIGURE.

The melting bath 1 into which the rod 2 is immersed may be a product to be vitrified, and may be corrosive at high temperatures. The applicants have developed a cold crucible technique in which the products to be vitrified are not heated by means of the crucible that contains them, but rather by electromagnetic induction phenomena, while the crucible is cooled and is covered with a solidified layer of the bath material that is not corrosive. The invention is frequently used in this type of cold crucibles, but other applications are not excluded.

The rod 2 comprises a cylindrical outer casing 4 finishing on an end piece 5 at the free end of the rod 2, a gas injection duct 6 extending along the centre line of the casing 4, passing through the end piece and finishing at one orifice 7, and a sleeve 8 between the casing 4 and the duct 6 and parallel to them, that finishes at a short distance from the end piece 5. The end piece 5 is engaged in the end of the casing 4 (as it is shown) or is an extension to it. The cooling liquid supply pipe 9 opens up into the vertices of the sleeve 8, and the cooling liquid evacuation pipe 10 opens up into the casing 4. Cooling liquid passes through the sleeve 8 towards the end piece 5, in front of which it exits from the sleeve 8 to start counter current circulation between the sleeve and the casing 4 as far as the duct 10.

The casing 4 is thin so that the rod 2 is not too heavy, but the end piece 5 is solid and is much thicker, its thickness (or height) may for example be 35 mm, but the value is chosen so as to obtain a temperature in the molten bath high enough to be able so that the gas flow necessary for the measurement can be ejected due to sufficient fluidity of the bath, but also low enough to guarantee good mechanical behaviour and resistance to corrosion at the end of the rod 2.

In the case of a bath of molten material at approximately 1200° C. to 1300° C. and a rod made of a metallic material such as Inconel, the rod being immersed into the bath by a length of about half a meter, a flow of water at 20° is applied to extract a heat power of 5.3 kW; the bath is then cooled to about 600° C. along casing 4, which solidifies usual baths. However, although the cooling jet is directed towards the end piece 5, the end piece is cooled more moderately due to its thickness; the temperature is of the order of 1000° C. on its inside or free face 11, such that the bath 1 remains liquid at this point and there is no risk of blocking the orifice 7. Corrosion by the bath 1 at these temperatures is moderate. The end piece 5 can be cooled more provided that the bath 1 remains liquid in front of it.

What is claimed is:

1. A measurement probe for measuring a level of a molten liquid bath, the probe comprising:

an outer casing;

an end piece having an orifice, the end piece being disposed at an end portion of the outer casing; and a gas injection tube disposed inside of the outer casing and connected to the orifice in the end piece, wherein a measurement of the level in the molten liquid bath is based at least on a pressure measurement of a flow of gas into the liquid bath through the gas injection tube.

2. The probe of claim 1, further comprising:

a sleeve disposed inside of the outer casing, said sleeve forming a flow channel for cooling the probe.

3. The probe of claim 1, wherein a thickness of the end piece is substantially larger than a thickness of the outer casing.

4. The probe of claim 1, wherein the probe is made of metal.

5. The probe of claim 4, wherein the metal is Inconel.

6. The probe of claim 2, wherein a flow rate of a cooling liquid flowing through the flow channel is adjusted to cool the liquid bath at a location in front of the end piece to a temperature slightly greater than the solidification temperature of the liquid bath.

* * * * *